(12) United States Patent
Yasuda et al.

(10) Patent No.: US 6,874,822 B2
(45) Date of Patent: Apr. 5, 2005

(54) RESINOUS TUBE

(75) Inventors: Zenichi Yasuda, Aichi-ken (JP); Natsushi Miura, Aichi-ken (JP); Tomokazu Hori, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/186,679

(22) Filed: Jul. 2, 2002

(65) Prior Publication Data

US 2003/0047942 A1 Mar. 13, 2003

(30) Foreign Application Priority Data

Sep. 7, 2001 (JP) ........................................ 2001-271771

(51) Int. Cl.$^7$ ................................................ F16L 21/00
(52) U.S. Cl. ........................ 285/242; 285/232; 285/236; 285/252; 285/254; 285/348
(58) Field of Search ................................. 285/239, 242, 285/252, 254, 231, 232, 236, 319, 348

(56) References Cited

U.S. PATENT DOCUMENTS

| | | | | |
|---|---|---|---|---|
| 2,416,618 A | * | 2/1947 | Ferla | 277/625 |
| 3,165,324 A | * | 1/1965 | Zopfi | 277/615 |
| 3,887,674 A | * | 6/1975 | Oostenbrink | 264/523 |
| 3,891,250 A | * | 6/1975 | Oetiker | 285/242 |
| 3,916,502 A | * | 11/1975 | Bagnulo | 29/890.14 |
| 4,564,221 A | * | 1/1986 | Ishii | 285/239 |
| 4,611,832 A | * | 9/1986 | Matsuoka et al. | 285/55 |
| 4,776,616 A | * | 10/1988 | Umehara et al. | 285/133.21 |
| 4,850,622 A | * | 7/1989 | Suzuki | 285/288.1 |
| 4,915,421 A | * | 4/1990 | Dennany Jr. | 285/39 |
| 5,129,685 A | * | 7/1992 | Engel | 285/231 |
| 5,354,106 A | * | 10/1994 | Washizu et al. | 285/319 |
| 5,476,290 A | * | 12/1995 | Bergmann et al. | 285/110 |
| 5,575,512 A | * | 11/1996 | Umezawa | 285/319 |
| 5,722,702 A | * | 3/1998 | Washburn | 285/340 |
| 5,882,048 A | | 3/1999 | Kawasaki et al. | |
| 5,890,749 A | * | 4/1999 | Fukaya et al. | 285/319 |
| 5,895,078 A | * | 4/1999 | Le Clinche | 285/305 |
| 6,082,783 A | | 7/2000 | Kawasaki et al. | |
| 6,155,610 A | * | 12/2000 | Godeau et al. | 285/242 |
| 6,318,410 B1 | | 11/2001 | Miyajima et al. | |
| 6,412,830 B1 | * | 7/2002 | Akiyama et al. | 285/319 |
| 6,428,055 B1 | * | 8/2002 | Moretti et al. | 285/319 |
| 6,435,567 B2 | * | 8/2002 | Kikumori et al. | 285/319 |
| 6,578,879 B2 | * | 6/2003 | Muto | 285/322 |

FOREIGN PATENT DOCUMENTS

| | | | | |
|---|---|---|---|---|
| JP | 3-129192 | * | 6/1991 | ................. 285/319 |
| JP | 4-34291 | * | 2/1992 | ................. 285/319 |
| JP | 06-050482 | | 2/1994 | |

* cited by examiner

*Primary Examiner*—James M. Hewitt
(74) *Attorney, Agent, or Firm*—Posz & Bethards, PLC

(57) ABSTRACT

A resinous tube has opposite ends into one of which a mating member is fitted and with which the mating member is connected, and includes a sealing ring, a fastening cap, and a clamp. The sealing ring is disposed on an inner peripheral surface of the opposite end, and contacts elastically with an outer peripheral surface of the mating member. The fastening cap is disposed on the inner peripheral surface of the opposite end on an outer end side thereof with respect to the sealing ring, and contacts elastically with the outer peripheral surface of the mating member. The clamp is disposed on an outer peripheral surface of the opposite end, which is provided with the fastening cap on the inner peripheral surface, and tightens the fastening cap. The resinous tube exhibits good sealing and fastening abilities, requires less component parts, and can be connected with any mating members.

5 Claims, 5 Drawing Sheets

RESINOUS TUBE

BACKGROUND OF THE INVENTION

1. Field of the Invention

The present invention relates to a resinous tube which is used for distributing fuels, coolants, and the like.

2. Description of the Related Art

Resinous tubes exhibit a higher rigidity than rubber tubes, and so on. Moreover, when the resinous tubes are provided with a bellows, or the like, they show a high degree of freedom in piping arrangements. Accordingly, the resinous tubes are used as members which make filler pipes, radiator hoses, and so forth.

However, when resinous tube are used, there arises the problem concerning the connecting mechanisms with the mating members, such as pipes, hoses, and so on. Namely, the resinous tubes exhibit rigidity to a certain extent. Accordingly, compared with rubber tubes, etc., it is less likely that the resinous tubes securely exhibit adherence with respect to the mating members. When the adherence is low, the sealing ability between the resinous tubes and the mating members lowers. Moreover, the fastening ability between the resinous tubes and the mating members lowers so that the resinous tubes are likely to come off from the mating members.

Hence, the sealing ability and the fastening ability have been conventionally secured between the resinous tubes and the mating member by means of the following connecting mechanisms described below.

FIG. 5 illustrates a cross sectional view of a connecting mechanism by means of a snap-action connector (hereinafter referred to as a "quick connector") method which is taken in the axial direction. Note that the alternate long and short dash line specifies the axial central line in the drawing. Moreover, since the opposite side (i.e., the lower side in the drawing) is symmetric linearly with respect to the axial center line, it is not illustrated. As illustrated in the drawing, the connecting mechanism secures the sealing ability and the fastening ability by intervening a quick connector 202 between a resinous tube 200 and a mating member 201. The quick connector 202 comprises a housing 205, sealing rings 204 and a retainer 203. The housing 205 is formed as a cylinder shape, and has a minor diameter portion and a major diameter portion. The minor diameter portion of the housing 205 is fitted into an opposite end of the resinous tube 200 by pressing. Thus, the sealing ability and the fastening ability are secured between the resinous tube 200 and the quick connector 202. Further, into the major diameter portion of the housing 205, an opposite end of the mating member 201 is fitted. Furthermore, on an inner peripheral surface of the major diameter portion, the sealing rings 204 and the retainer 203 are disposed in series from the inner side toward the outer end side. The retainer 203 is formed as a letter "L" shape in cross section. On the other hand, on an opposite-end outer-peripheral surface of the mating member 201, there is disposed a flange-shaped bead 206 therearound. Thus, by engaging the retainer 203 with the bead 206, the fastening ability is secured between the quick connector 202 and the mating member 201. Moreover, by elastically bringing the sealing rings 204 into contact with the outer peripheral surface of the mating member 201, the sealing ability is secured between the quick connector 202 and the mating member 201.

FIG. 6 illustrates a cross sectional view of a connecting mechanism by means of a rubber sealing member method which is taken in the axial direction. Note that the alternate long and short dash line specifies the axial central line in the drawing. Moreover, since the opposite side (i.e., the lower side in the drawing) is symmetric linearly with respect to the axial center line, it is not illustrated. As illustrated in the drawing, the connecting mechanism secures the fastening ability and the sealing ability by intervening a rubber sealing member 302 between a resinous tube 300 and a mating member 301. The rubber sealing member 302 is formed as a cylinder shape, and is disposed between an inner peripheral surface of the resinous tube 300 and an outer peripheral surface of the mating member 301. Further, the rubber sealing member 302 is tightened by a clamp 303 from the outer peripheral side of the resinous tube 300. Furthermore, the rubber sealing member 302 exerts an elastic force and the clamp 303 exerts a tightening force so that the fastening ability and the sealing ability are secured between the resinous tube 300 and the mating member 301.

FIG. 7 illustrates a cross sectional view of a connecting mechanism by means of an engagement method which is taken in the axial direction. The connecting mechanism is set forth in Japanese Unexamined Patent Publication (KOKAI) No. 6-50,482. Note that the alternate long and short dash line specifies the axial central line in the drawing. Moreover, since the opposite side (i.e., the lower side in the drawing) is symmetric linearly with respect to the axial center line, it is not illustrated. As illustrated in the drawing, sealing rings 101 are assembled around an opposite end of a resinous tube 100. Further, on an outer peripheral surface of the resinous tube 100, there are disposed engagement claws 102 at predetermined angular intervals. On the other hand, at a terminal end of an opposite end of a mating member 103, there is disposed an engagement portion 104. The engagement portion 104 is formed as a letter "U" shape in cross section by bending. When the resinous tube 100 is fitted into the mating member 103, the engagement claws 102 engage with the engagement portion 104. By the engagement, the fastening ability is secured between the resinous tube 100 and the mating member 103. In addition, when the resinous tube 100 is fitted into the mating member 103, the sealing rings 101 are brought into contact with an inner peripheral surface of the mating member 103 elastically. Note that the sealing rings 101 are disposed in sealing ring retainer grooves 105 which are formed in the outer peripheral surface of the resinous tube 100. By the elastic contact, the sealing ability is secured between the resinous tube 100 and the mating member 103.

However, when the conventional connecting mechanism illustrated in FIG. 5 is used, since it is necessary to independently dispose the quick connector 202, it results not only in raising up the cost but also in increasing the number of the component parts. Moreover, the man-hour requirements for bonding the resinous tube 200 with the mating member 201 are thereby enlarged. In addition, it is required to form the bead 206 on the mating member 201 for the engagement with the retainer 203. In other words, by the quick connector 202, it is not possible to connect a resinous tube with mating members which are free from the bead 206.

Further, when the conventional connecting mechanism illustrated in FIG. 6 is used, there arises a problem in a case where the resinous tube 300 is used for filler pipes. Namely, in the applications to filler pipes, members, such as a pipe, and the like, which make a fuel passage, are required to exhibit a low fuel permeability. The rubber sealing member 302, however, exhibits a high fuel permeability. In this instance, it is possible to think of forming the rubber sealing member 302 itself of materials, such as fluoroelastomers, and so on, which exhibit a low fuel permeability. However, the materials, which exhibit a low fuel permeability, are expensive in general. Accordingly, when the entire rubber sealing member 302 is formed of a material, which exhibits a low permeability, the cost goes up inevitably. Moreover, in this method, since one and only sealing member is responsible for both the sealing function and the coming-off inhibiting function, it is difficult to set up the material designing in view of satisfying both the sealing function and the coming-off inhibiting function at a higher level. Specifically, it is difficult to simultaneously satisfy both of the permeability and the permanent set in fatigue. In addition, when the inside diameter of the rubber sealing member 302 is reduced, the connecting mechanism suffers from the problem of the lowering operability in press-fitting.

Furthermore, when the conventional connecting mechanism illustrated in FIG. 7 is used, it is necessary to form the engagement portion 104 at the terminal end of the opposite end of the mating member 103. To put it differently, it is not possible to connect the resinous tube 100 with mating members which are free from the engagement portion 104. Moreover, the resinous tube 100 is provided with the engagement claws 102. Consequently, when the resinous tube 100 is produced, it is necessary to carry out a step of manufacturing a tube body by blow molding, and subsequently a step of bonding the engagement claws 102 with the resulting tube body by injection molding. Therefore, the production process requires so many steps that it is troublesome.

The present invention has been completed in view of the aforementioned problems. It is therefore an object of the present invention to provide a resinous tube which is good in terms of the sealing ability and the fastening ability, which requires less component parts and is accordingly less expensive, and which is connectable with mating members whatever they are.

It is possible for a resinous tube according to the present invention to achieve the aforementioned object. The present resinous tube is a resinous tube having opposite ends into one of which a mating member is fitted and with which the mating member is connected, and comprises: a sealing ring being disposed on an inner peripheral surface of one of the opposite ends, and contacting elastically with an outer peripheral surface of the mating member; a fastening cap being disposed on the inner peripheral surface of the opposite end on an outer end side thereof with respect to the sealing ring, and contacting elastically with the outer peripheral surface of the mating member; and a clamp being disposed on an outer peripheral surface of the opposite end, the opposite end being provided with the fastening cap on the inner peripheral surface, and tightening the fastening cap.

Namely, in the present resinous tube, the sealing ring and the fastening cap are disposed on the inner peripheral surface of the opposite end in series from the inner side of the present resinous tube to the opposite-end side thereof. Moreover, the clamp is disposed on the outer peripheral surface of the opposite end in order to tighten the fastening cap. Thus, the sealing ring secures the sealing ability between the resinous tube and the mating member. Simultaneously, the fastening cap and the clamp secure the fastening ability between both of the members.

It is possible to readily connect the present resinous tube with mating members which are free from the bead 206 as illustrated in FIG. 5, and which are free from the engagement portion 104 as illustrated in FIG. 7. Moreover, when the present resinous tube is connected with mating members, it is not necessary to intervene such a member as the quick connector 202 as illustrated in FIG. 5. In addition, when the present resinous tube is used for filler pipes, for instance, it is possible to suppress fuels from permeating by forming only the sealing ring of materials, which exhibit a low fuel permeability, such as fluoroelastomers, and the like. Accordingly, the present resinous tube requires a low cost for reducing the fuel permeability.

For example, it is possible to produce the present resinous tube by the following process. The process comprises the steps of: manufacturing a continuous tube body, in which tube bodies having opposite ends are disposed in series, continuously; cutting the resultant continuous tube body to the respective tube bodies; and fitting a sealing ring and a fastening cap in this order into an inner-peripheral-surface side of one of the opposite ends of the cut tube bodies.

Namely, in the production process, the tube bodies are manufactured continuously as the continuous tube body. In the present resinous tube, a component member, such as the engagement claw 102 as illustrated in FIG. 7, is not disposed. Consequently, it is not necessary to carry out the step of disposing a component member on the tube body individually. Therefore, it is possible to continuously manufacture the tube bodies by a single step, and thereby it is possible to reduce the number of the production steps. Note that, in the step of manufacturing the continuous tube body, it is possible to use an extrusion blow molding method, and so forth. In the extrusion blow molding method, air is pressurized and entered a parison, which is made from a resin and is extruded out of an extrusion molding machine, and the parison is pressed onto a molding mold in order to arrange its shape.

Moreover, it is possible to dispose the clamp on the outer peripheral surface of the opposite end of the tube bodies at any time after the step of cutting the continuous tube body. For instance, after the step of disposing the sealing ring and the fastening ring on the inner peripheral surface of the opposite end, it is possible to temporarily dispose the clamp on the outer peripheral surface of the opposite end of the tube bodies. Then, after the mating member is fitted into the opposite end of the tube bodies, it is possible to additionally tighten the clamp. Alternatively, after the mating member is fitted into the opposite end of the tube bodies, it is possible to dispose the clamp on the outer peripheral surface of the opposite end of the tube bodies. Subsequently, it is possible to tighten the clamp.

It is preferable to arrange so that the opposite end can be formed so that it has a thinner thickness at a portion on which the fastening cap is disposed than at a portion on which the sealing ring is disposed.

Namely, in such an arrangement, the opposite end of the present resinous tube is provided with a heavy-thickness portion and a thin-thickness portion. Specifically, the heavy-thickness portion is disposed at a portion in which the sealing ring is inscribed, and the thin-thickness portion is disposed at a portion in which the fastening cap is inscribed and on which the fastening cap is circumscribed, respectively.

When the heavy-thickness portion is disposed at a portion in which the sealing ring is inscribed, it is possible to enhance the rigidity of the opposite end of the present resinous tube. Moreover, when the thin-thickness portion is disposed at a portion in which the fastening cap is inscribed and on which the fastening cap is circumscribed, it is possible to transmit the tightening force of the clamp to the fastening cap without being obstructed by the thickness of the present resinous tube. Accordingly, the present resinous tube exhibits a more favorable fastening ability.

It is more preferable to arrange so that the fastening cap can have an inside diameter equal to or slightly smaller than an outside diameter of the mating member.

Namely, in such an arrangement, the inside diameter of the fastening cap is designed to a relatively large diameter. The fastening cap of the present resinous tube is tightened by the clamp from the outer peripheral side. Consequently, it is possible to readily secure a fastening ability without excessively reducing the inside diameter of the fastening cap.

In accordance with such an arrangement, the frictional force is reduced when the mating member is fitted into the present resinous tube. Accordingly, it is possible to furthermore smoothly fit the mating member into the present resinous tube.

Moreover, it is preferable to arrange so that a plurality of the sealing rings can be disposed, and so that a spacer can intervene between the sealing rings, respectively.

Namely, in such an arrangement, a plurality of the sealing rings are disposed on the inner peripheral surface of the opposite end of the present resinous tube. Then, the spacers separate between the sealing rings, respectively.

In accordance with such an arrangement, it is possible to readily carry out positioning the sealing rings by the spacers. Specifically, it is possible to readily position the sealing rings by the fastening cap and the spacers. Consequently, it is possible to obviate such portions like the sealing ring retainer grooves 105 as illustrated in FIG. 7.

In addition, it is preferable to arrange so that a ring can be further disposed on an inner side with respect to the sealing ring, so that the opposite end can be formed as such a thin thickness that it is capable of diametrically enlarging, and so that the sealing ring and the ring can be brought into contact with the inner peripheral surface of the opposite end elastically by the diametrically enlarged opposite end.

Namely, in such an arrangement, the entire opposite end of the present resinous tube is formed as such a thin thickness that it is capable of deforming elastically so as to diametrically enlarge. Moreover, the ring is disposed next to the sealing ring on an inner side of the present resinous tube with respect to the sealing ring. When nothing is fitted into the opposite end of the present resinous tube, the inside diameter of the opposite end is designed to be smaller than the outside diameters of the ring and the sealing ring. When the ring and the sealing ring are fitted into the opposite end by pressing, the opposite end is elastically deformed to diametrically enlarge. Then, the opposite end comes to tighten the ring and the sealing ring from the outer peripheral surfaces by a repulsive diametrically reducing force.

In accordance with such an arrangement, it is possible to reinforce the sealing force of the sealing ring by the repulsive diametrically reducing force. Moreover, since the ring is disposed, it is possible to suppress the rigidity of the opposite end of the present resinous tube from lowering, which results from thinning out the opposite end. Note that the opposite end can have such a thin thickness that it is capable of deforming elastically so as to diametrically enlarge. Accordingly, the desired thickness of the opposite end depends on the materials, and so forth, of the present resinous tube, the sealing ring and the ring.

In accordance with the present invention, it is possible to provide a resinous tube which is good in terms of the sealing ability and the fastening ability, which requires less component parts and is accordingly less expensive, and which is connectable with mating members whatever they are.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Hereinafter, the resinous tube according to the present invention will be described with reference to specific examples which embody the present resinous tube in the applications to fuel filler pipes.

EXAMPLE NO. 1

Figure 1:
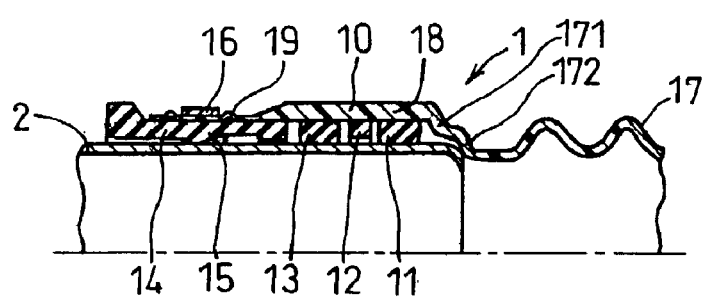
FIG. 1 is a cross sectional view of a resinous tube according to Example No. 1 in the axial direction.

First, the arrangement of the resinous tube according to Example No. 1 will be described. FIG. 1 illustrates a cross sectional view of a resinous tube 1 according to Example No. 1 in the axial direction. Note that the alternate long and short dash line specifies the axial central line in the drawing. Moreover, since the opposite side (i.e., the lower side in the drawing) is symmetric linearly with respect to the axial center line, it is not illustrated. In the resinous tube 1 according to Example No. 1, a tube body 17 is formed of polyamide (PA) as a tubular shape having a bellows portion. Into an opposite end 10 of the tube body 17, a mating member 2 is fitted, and is connected with the tube body 17. The mating member 2 is formed of a metal as a pipe shape.

The opposite end 10 comprises a heavy-thickness portion 18 and a thin-thickness portion 19. The heavy-thickness portion 18 is disposed on an inner side of the tube body 17. The thin-thickness portion 19 is disposed on an outer end side of the tube body 17. On an inner peripheral surface of the heavy-thickness portion 18, a sealing ring 11, a spacer 12 and a sealing ring 13 are disposed in series from the inner side of the resinous tube 1 to the outer end side thereof. Namely, the two sealing rings 11 and 13 are disposed so that they are separated by the spacer 12. The sealing rings 11 and 13 are formed of fluoroelastomer (FKM). Note that inside diameters of the sealing rings 11 and 13 are designed so that they are smaller than an outside diameter of the mating member 2.

Moreover, from the outer end of the thin-thickness portion 19 to the inner peripheral surface thereof, a fastening cap 14 is disposed. The fastening cap 14 is formed of rubber as a cylinder shape. Around an inner peripheral surface of the fastening cap 14, a projection part 15 is formed in a ring-like manner. The projection part 15 is formed as a triangular shape in cross section. Note that an inside diameter of the projection part 15 is designed to be substantially equal to the outside diameter of the mating member 2. In addition, a clamp 16 is assembled around a portion on the outer peripheral surface of the thin-thickness portion 19, the portion being radially outwardly opposite with respect to the portion in the inner peripheral surface at which the projection part 15 is formed. The clamp 16 is made of a metal.

Figure 2:
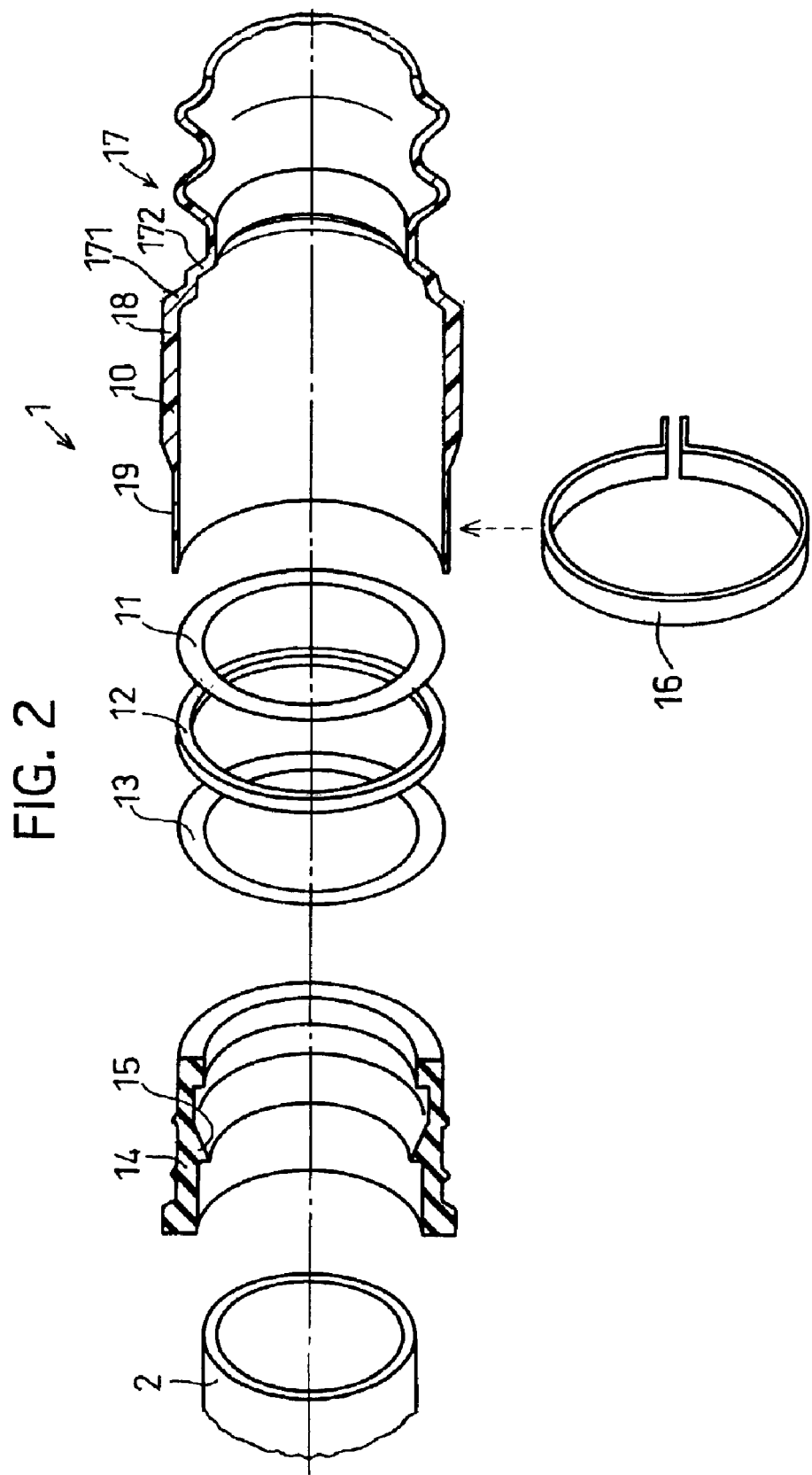
FIG. 2 is an exploded perspective of the resinous tube according to Example No. 1.

Next, the present invention will be described with reference to how to assemble the resinous tube 1 according to Example No. 1. FIG. 2 illustrates an exploded perspective view of the resinous tube 1 according to Example No. 1. Note that the tube body 17 and the fastening cap 14 are illustrated in cross sections in view of descriptive convenience.

The tube body 17 is manufactured in the following manner. First, a continuous tube body, in which a plurality of the tube bodies 17 are connected in series, is manufactured. Then, the resulting continuous tube body is cut to the respective tube bodies 17. Namely, the tube bodies 17, which include the opposite end 10, are manufactured continuously. Here, the heavy-thickness portion 18 of the opposite end 10 is formed by slowing a supply rate of the resinous raw material. On the other hand, the thin-thickness portion 19 of the opposite end 10 is formed by fastening the supply rate of the resinous raw material.

Subsequently, into the inner peripheral side of the thus manufactured heavy-thickness portion 18, the sealing ring 11, the spacer 12 and the sealing ring 13 are fitted in this order. Thereafter, the fastening cap 14 is fitted into the opposite end 10 so as to cover the outer end of the opposite end 10 of the tube body 17. Thereafter, around the outer peripheral surface of the thin-thickness portion 19 of the opposite end 10, the clamp 16 is assembled in such a state that it is fastened temporarily.

Further, the present invention will be described with reference to the mechanism of connecting the resinous tube 1 according to Example No. 1 with the mating member 2. As described above, the inside diameters of the sealing rings 11 and 13 are designed so that they are smaller than the outside diameter of the mating member 2. In addition, the inside diameter of the projection part 15 is designed so that it is substantially equal to the outside diameter of the mating member 2. As the mating member 2 is fitted into the opposite end 10 of the resinous tube 1, the mating member 2 first passes on the inner peripheral surface of the projection part 15. However, the inside diameter of the projection part 15 is substantially equal to the outside diameter of the mating member 2. Accordingly, the frictional force is exerted less to the mating member 2. Therefore, the mating member 2 passes smoothly on the inner peripheral surface of the projection part 15 relatively.

Furthermore, the mating member 2 passes on the inner peripheral surface of the sealing ring 13. Here, note that the inside diameter of the sealing ring 13 is smaller than the outside diameter of the mating member 2. Accordingly, a large frictional force acts onto the mating member 2. Therefore, the sealing ring 13 itself is drawn by the frictional force so that it tries to move together with the mating member 2 in the fitting direction, namely, toward the inner side of the resinous tube 1. However, on the inner side of the resinous tube 1 with respect to the sealing ring 13, the spacer 12 neighbors on the sealing ring 13. The inside diameter of the spacer 12 is larger than the outside diameter of the mating member 2. Consequently, the spacer 12 is not affected by the movement of the mating member 2. Therefore, the sealing ring 13 is inhibited from moving by the spacer 12. Thus, the mating member 2 passes on the inner peripheral surface of the sealing ring 13 while sliding thereon.

Moreover, the mating member 2 passes on the inner peripheral surface of the sealing ring 11. Here, note that, similarly to the sealing ring 13, the inside diameter of the sealing ring 11 is smaller than the outside diameter of the mating member 2. Accordingly, the sealing ring 11 as well tries to move together with the mating member 2 in the fitting direction, namely, toward the inner side of the resinous tube 1. However, a sealing-ring-position regulatory portion 171 is formed as a stair-like shape, which reduces its diameter toward the inner side of the resinous tube 1, on the inner side of the resinous tube 1 with respect to the sealing ring 11. Hence, the sealing ring 11 is inhibited from moving by the sealing-ring-position regulatory portion 171. Thus, the mating member 2 passes on the inner peripheral surface of the sealing ring 11 while sliding thereon. The fitting of the mating member 2 is completed when the leading end of the mating member 2 contacts with a mating-member-leading-end stopper portion 172, which is disposed on the inner side of the resinous tube 1 with respect to the sealing-ring-position regulatory portion 171. The mating-member-leading-end stopper portion 172 is tapered from wide to narrow diametrically in the direction away from the opposite end 10 of the resinous tube 1. Finally, the clamp 16, which is disposed on the outer peripheral surface of the thin-thickness portion 19, is tightened up. The tightening force is transmitted to the projection part 15 by way of the thin-thickness portion 19. As a result, the projection part 15 is pressed onto and brought into contact with the outer peripheral surface of the mating member 2 in a ring-like manner.

Figure 7:
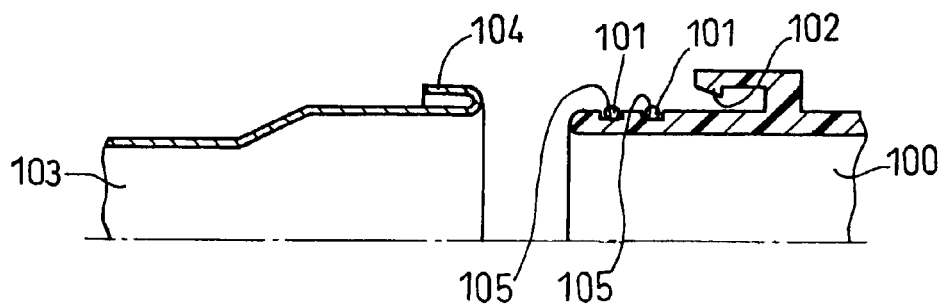
FIG. 7 is a cross sectional view of the mechanism for connecting a resinous tube by the conventional engagement method in the axial direction.

In the resinous tube 1 according to Example No. 1, the inside diameter of the projection part 15 is substantial equal to the outside diameter of the mating member 2. Accordingly, it is possible to smoothly fit the mating member 2 into the resinous tube 1. Moreover, the two sealing rings 11 and 13 are positioned by the fastening cap 14, the sealing-ring-position regulatory portion 171 and the spacer 12. Consequently, it is not required to independently form, for example, the positioning portions, such as the sealing-ring retainer grooves 105 as illustrated in FIG. 7, and so forth, in the inner peripheral surface of the heavy-thickness portion 18.

In Example No. 1, the heavy-thickness portion 18 and the thin-thickness portion 19 are formed in the opposite end 10. However, it is possible to carry out Example No. 1 in such a mode that the thickness of the opposite end 10 is made uniform. When the opposite end 10 is formed so as to have a uniform thickness, it is possible to mold the tube body 17 with ease. Further, in Example No. 1, the two sealing rings 11 and 13 are disposed in the tube body 17. However, only one sealing ring can be disposed therein. When one and only sealing ring is disposed therein, it is possible to obviate the spacer 12 because the sealing ring can be positioned by a fastening cap and a sealing-ring-position regulatory portion.

Furthermore, in Example No. 1, the fastening cap 14 is provided with the projection part 15. However, it is possible to carryout Example No. 1 in such a mode that a fastening cap is brought into contact with a mating member as a whole, or in such a mode that a plurality of projection parts are formed on the inner peripheral surface of a fastening cap. Moreover, in Example No. 1, the inside diameter of the projection part 15 is designed to be substantially equal to the outside diameter of the mating member 2. However, it is possible to carry out Example No. 1 in such a mode that the inside diameter of the projection part 15 is designed to be smaller than the outside diameter of the mating member 2. If such is the case, it is possible to enhance the fastening ability between the resinous tube 1 and the mating member 2. In addition, in Example No. 1, polyamide (PA) is used as a raw material for the resinous tube 1. However, it is possible to use polyethylene (PE) or polyphenylene sulfide (PPS) as a raw material therefor. Still further, in Example No. 1, fluoroelastomer (FKM) is used as a raw material for the sealing rings 11 and 13. However, the raw material for a sealing ring is not limited in particular. When the present resinous tube is used in the applications to filler pipes, it is possible to use the other rubber, which exhibits a low fuel permeability, such as hydrogenated nitrile-butadiene rubber (H-NBR), and the like.

EXAMPLE NO. 2

Figure 3:
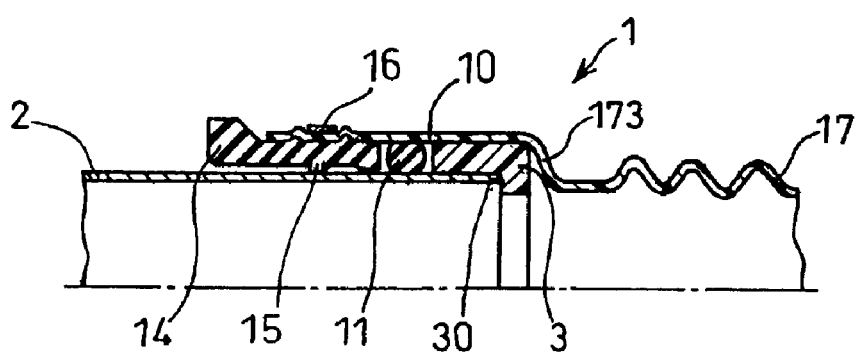
FIG. 3 is a cross sectional view of a resinous tube according to Example No. 2 in the axial direction.

First, the arrangement of the resinous tube according to Example No. 2 will be described. FIG. 3 illustrates a cross sectional view of a resinous tube 1 according to Example No. 2 in the axial direction. Note that, in the drawing, the component parts like those of Example No. 1 are designated with the same reference numerals as FIG. 1. Moreover, in the drawing, the alternate long and short dash line specifies the axial central line. In addition, since the opposite side (i.e., the lower side in the drawing) is symmetric linearly with respect to the axial center line, it is not illustrated. In the resinous tube 1 according to Example No. 2, a tube body 17 is formed of polyamide (PA). Into an opposite end 10 of the tube body 17, a mating member 2 is fitted, and is connected with the tube body 17. The mating member 2 is formed of a metal as a pipe shape.

The opposite end 10 is formed so that it has a thin thickness as a whole. Moreover, the opposite end 10 is made capable of deforming elastically so as to diametrically enlarge. On an inner peripheral surface of the opposite end 10, a ring 3, a sealing ring 11 and a fastening cap 14 are disposed in series from the inner side of the resinous tube 1 to the outer end side thereof. The ring 3 is formed as a cylinder shape which has a step 30 on an opposite end side with respect to the inner side of the resinous tube 1. Moreover, the ring 3 is formed of polyamide (PA). An inside diameter of the ring 3 is designed to be substantially equal to an outside diameter of the mating member 2. In addition, an inside diameter of the ring 3 is designed to be larger than an inside diameter of the opposite end 10 prior to the diametric enlargement. The sealing ring 11 is formed of fluoroelastomer (FKM). An inside diameter of the sealing ring 11 is designed to be smaller than the outside diameter of the mating member 2. Still further, similarly to the ring 3, an outside diameter of the sealing ring 11 is designed to be larger than the inside diameter of the opposite end 10 prior to the diametric enlargement.

From the outer end of the opposite end 10 to the inner peripheral surface thereof, a fastening cap 14 is disposed. The fastening cap 14 is made of rubber, and is formed as a cylinder shape. Around an inner peripheral surface of the fastening cap 14, a projection part 15 is formed in a ring-like manner. The projection part 15 is formed as a triangular shape in cross section. Note that an inside diameter of the projection part 15 is designed to be substantially equal to the outside diameter of the mating member 2. In addition, a clamp 16 is assembled around a portion on the outer peripheral surface of the opposite end 10, the portion being radially outwardly opposite with respect to the portion in the inner peripheral surface at which the projection part 15 is disposed. The clamp 16 is made of a metal.

Figure 4:
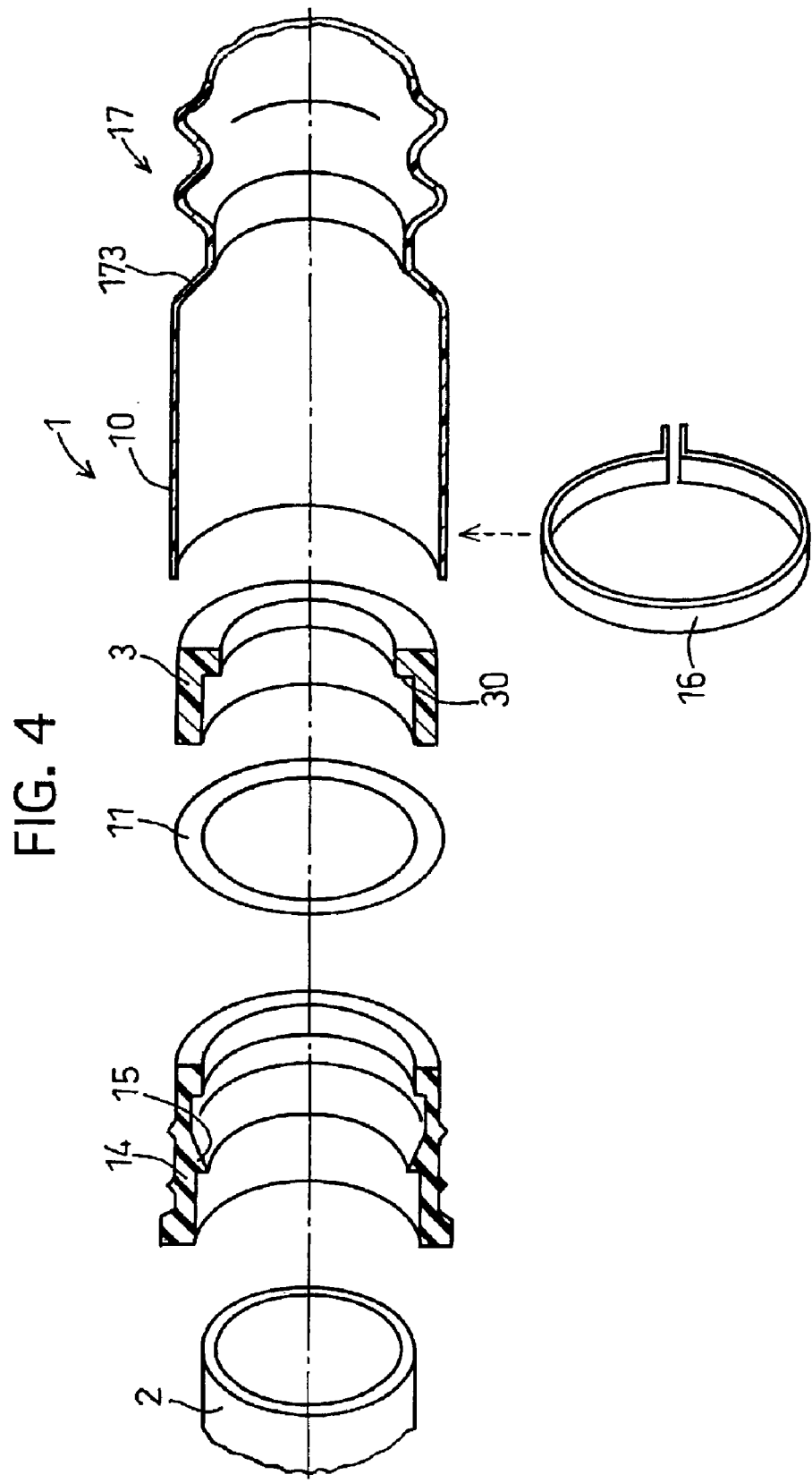
FIG. 4 is an exploded perspective of the resinous tube according to Example No. 2.
Figure 5:
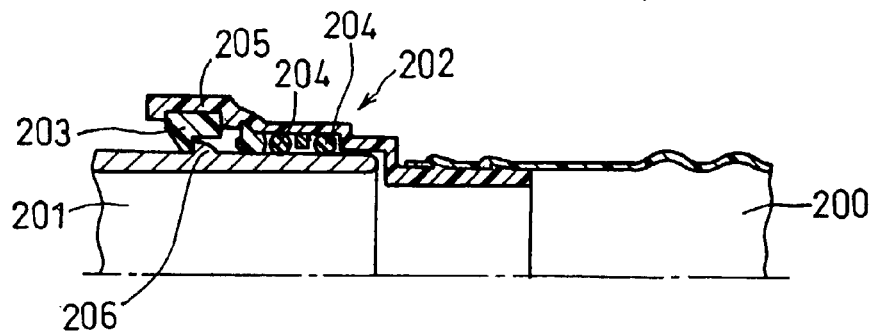
FIG. 5 is a cross sectional view of the mechanism for connecting a resinous tube by the conventional quick-connector method in the axial direction.
Figure 6:
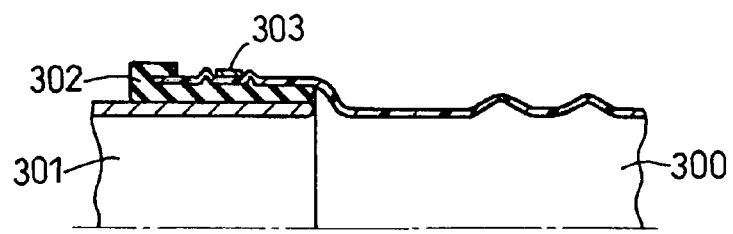
FIG. 6 is a cross sectional view of the mechanism for connecting a resinous tube by the conventional rubber-sealing-member method in the axial direction.

Next, the present invention will be described with reference to how to assemble the resinous tube 1 according to Example No. 2. FIG. 4 illustrates an exploded perspective view of the resinous tube 1 according to Example No. 2. Note that the tube body 17, the ring 3 and the fastening cap 14 are illustrated in cross sections in view of descriptive convenience.

Similarly to Example No. 1, the tube body 17 is manufactured in the following manner. First, a continuous tube body, in which a plurality of the tube bodies 17 are connected in series, is manufactured. Then, the resulting continuous tube body is cut to the respective tube bodies 17. However, since the opposite end 10 has a uniform thickness, it is not necessary to control the supply rate of the resinous raw material as set forth in Example No. 1.

Subsequently, into the inner peripheral side of the thus manufactured opposite end 10, the ring 3 is first fitted. As described above, the outside diameter of the ring 3 is larger than the inside diameter of the opposite end 10. Accordingly, when the ring 3 is fitted into the opposite end 10 by pressing, the opposite end 10 is deformed to diametrically enlarge. Note that the ring 3 is fitted into the opposite end 10 until it is brought into contact with a ring-position regulatory portion 173. Further, the sealing ring 11 is fitted into the opposite end 10 by pressing. Similarly to the ring 3, the outside diameter of the sealing ring 11 is larger than the inside diameter of the opposite end 10. Consequently, when the sealing ring 11 is fitted into the opposite end 10 by pressing, the opposite end 10 is deformed to diametrically enlarge. Thereafter, the fastening cap 14 is fitted into the opposite end 10. Finally, around the outer peripheral surface of the opposite end 10, the clamp 16 is assembled in such a state that it is fastened temporarily.

Further, the present invention will be described with reference to the mechanism of connecting the resinous tube 1 according to Example No. 2 with the mating member 2. As described above, the inside diameter of the sealing ring 11 is designed so that it is smaller than the outside diameter of the mating member 2. In addition, the inside diameter of the projection part 15 is designed so that it is substantially equal to the outside diameter of the mating member 2. As the mating member is fitted into the opposite end 10 of the resinous tube 1, the mating member 2 first passes on the inner peripheral surface of the projection part 15. However, the inside diameter of the projection part 15 is substantially equal to the outside diameter of the mating member 2. Accordingly, the mating member 2 passes relatively smoothly on the inner peripheral surface of the projection part 15.

Furthermore, the mating member 2 passes on the inner peripheral surface of the sealing ring 11. Here, note that the inside diameter of the sealing ring 11 is smaller than the outside diameter of the mating member 2. Accordingly, a large frictional force acts onto the mating member 2. Therefore, the sealing ring 11 itself is drawn by the frictional force so that it tries to move together with the mating member 2 toward the inner side of the resinous tube 1. However, on the inner side of the resinous tube 1 with respect to the sealing ring 11, the ring 3 neighbors on the sealing ring 11. Consequently, the sealing ring 11 is inhibited from moving by the ring 3. Thus, the mating member 2 passes on the inner peripheral surface of the sealing ring 11 while sliding thereon.

Moreover, the mating member 2 passes on the inner peripheral surface of the ring 3. Here, note that the inside diameter of the ring 3 is substantially equal to the outside diameter of the mating member 2. Accordingly, the mating member 2 passes smoothly on the inner peripheral surface of the ring 3. The fitting of the mating member 2 is completed when the leading end of the mating member 2 contacts with the step 30 of the ring 3. Finally, the clamp 16, which is disposed on the outer peripheral surface of the opposite end 10, is tightened up. The tightening force is transmitted to the projection part 15 of the fastening cap 14 by way of the opposite end 10. As a result, the projection part 15 is pressed onto and brought into contact with the outer peripheral surface of the mating member 2 in a ring-like manner.

In the resinous tube 1 according to Example No. 2, a repulsive diametrically reducing force, which is exerted by the opposite end 10, reinforces the elastically contacting force, which is exerted by the sealing ring 11 and the pressing-and-contacting force exerted by the projection part 15. Accordingly, the sealing ability and the fastening ability are furthermore enhanced between the resinous tube 1 and the mating member 2. Moreover, in the resinous tube 1 according to Example No. 2, the inside diameters of the projection part 15 and the ring 3 are substantially equal to the outside diameter of the mating member 2. Consequently, it is possible to smoothly carry out fitting the mating member 2 into the opposite end 10 of the resinous tube 1. In addition, the sealing ring 11 is positioned by the fastening cap 14 and the ring 3. Accordingly, it is not required to independently dispose, for example, the positioning portions, such as the sealing-ring retainer grooves 105 as illustrated in FIG. 7, and so forth, in the inner peripheral surface of the opposite end 10.

In Example No. 2, one and only sealing ring is disposed in the tube body 17. However, it is possible to dispose a plurality of the sealing rings therein. When a plurality of the sealing rings are disposed therein, it is possible to enhance the sealing ability between the resinous tube 1 and the mating member 2. Further, in Example No. 2, the fastening cap 14 is provided with the projection part 15. However, it is possible to carry out Example No. 2 in such a mode that a fastening cap is brought into contact with a mating member as a whole, or in such a mode that a plurality of projection parts are formed on the inner peripheral surface of a fastening cap. Furthermore, in Example No. 2, the inside diameter of the projection part 15 is designed to be substantially equal to the outside diameter of the mating member 2. However, it is possible to carry out Example No. 2 in such a mode that the inside diameter of the projection part 15 is designed to be smaller than the outside diameter of the mating member 2. If such is the case, it is possible to enhance the fastening ability between the resinous tube 1 and the mating member 2. Moreover, in Example No. 2, the inside diameter of the ring 3 is designed to be substantially equal to the outside diameter of the mating member 2. However, it is possible to carry out Example No. 2 in such a mode that the inside diameter of the ring 3 is designed to be smaller than the outside diameter of the mating member 2. If such is the case, since the ring 3 has a heavy thickness, the rigidity of the opposite end 10 is furthermore augmented. In addition, in Example No. 2, polyamide (PA) is used as a raw material for the resinous tube 1 and the ring 3. However, it is possible to use polyethylene (PE) or polyphenylene sulfide (PPS) as a raw material therefor. Still further, in Example No. 2, fluoroelastomer (FKM) is used as a raw material for the sealing ring 11. However, the raw material for a sealing ring is not limited in particular. When the present resinous tube is used in the applications to filler pipes, it is possible to use the other rubber, which exhibits a low fuel permeability, such as hydrogenated nitrile-butadiene rubber (H-NBR), and the like.

OTHER MODIFIED VERSIONS

Heretofore, the resinous tube according to the present invention has been described with reference to specific examples. However, the modes for carrying out the present resinous tube are not limited to the above-described specific examples in particular. It is possible to carry out the present resinous tube in a variety of modified or improved modes which are possible for a person having ordinary skill in the art to carry out.

Having now fully described the present invention, it will be apparent to one of ordinary skill in the art that many changes and modifications can be made thereto without departing from the spirit or scope of the present invention as set forth herein including the appended claims.

What is claimed is:

1. A resinous tube having opposite ends into one of which a mating member is fitted and with which the mating member is connected, the resinous tube comprising:

a sealing ring being disposed on an inner peripheral surface of the opposite end, and contacting elastically with an outer peripheral surface of the mating member;

a fastening cap being disposed on the inner peripheral surface of the opposite end and exterior to the sealing ring, and having an inner peripheral surface around which a projection part is formed in a ring like manner, the projection part contacting elastically with the outer peripheral surface of the mating member;

a clamp being disposed on an outer peripheral surface of the opposite end, the opposite end being provided with the fastening cap on the inner peripheral surface, wherein said clamp acts to tighten said fastening cap and to thereby fasten said mating member; and a ring disposed within said resinous tube and interior to said sealing ring, wherein the opposite end is formed of a thickness sufficiently thin so as to be capable of diametrically enlarging, and said sealing ring and said ring are brought into contact with the inner peripheral surface of the opposite end elastically by the diametrically enlarged opposite end, said projection part is not pressed onto and not brought into contact with said mating member when the mating member is fitted into said opposite end, and said projection part is pressed onto and brought into contact with said mating member by tightening up said fastening cap with said clamp after the mating member is fitted into said opposite end.

2. The resinous tube according to claim 1, wherein said fastening cap has an inside diameter equal to or slightly smaller than an outside diameter of said mating member.

3. The resinous tube according to claim 1, further comprising a stopper portion for inhibiting said mating member from being further fitted into said opposite end upon contact therewith, the stopper portion being disposed within said resinous tube interior to said sealing ring.

4. A connecting mechanism for fastening a mating member with a resinous tube, the connecting mechanism comprising:
- a sealing ring disposed on an inner peripheral surface of an end portion of the resinous tube for contacting elastically with an outer peripheral surface of the mating member;
- a fastening cap disposed on the inner peripheral surface of the end portion and exterior to the sealing rinse, the fastening cap having an inner peripheral surface around which a projection part is formed in a ring like manner, the projection part for contacting elastically with an outer peripheral surface of the mating member;
- a clamp disposed on an outer peripheral surface of the end portion, wherein said clamp acts to tighten said fastening cap and to thereby fasten the mating member to the resinous tube; and
- a ring disposed within said resinous tube and interior to said sealing ring, wherein the end portion is formed of a thickness sufficiently thin so as to be capable of diametrically enlarging, and said sealing ring and said ring are brought into contact with the inner peripheral surface of the end portion elastically by the diametrically enlarged opposite end, said projection part is not pressed onto and not brought into contact with said mating member when the mating member is fitted into said opposite end, and said projection part is pressed onto and brought into contact with said mating member by tightening up said fastening cap with said clamp after the mating member is fitted into said opposite end.

5. The connecting mechanism of claim 4, wherein said ring includes a stopper portion for inhibiting the mating member from being further fitted into the tube upon contact therewith.

* * * * *